(12) United States Patent
Feklistov

(10) Patent No.: US 8,194,708 B2
(45) Date of Patent: Jun. 5, 2012

(54) LASER

(75) Inventor: Dmitri Feklistov, Grange (AU); Oksana Feklistova, legal representative, Grange (AU)

(73) Assignee: Ellex Medical Pty Ltd (AU)

( * ) Notice: Subject to any disclaimer, the term of this patent is extended or adjusted under 35 U.S.C. 154(b) by 0 days.

(21) Appl. No.: 12/519,084

(22) PCT Filed: Dec. 12, 2007

(86) PCT No.: PCT/AU2007/001912
§ 371 (c)(1),
(2), (4) Date: Jan. 27, 2010

(87) PCT Pub. No.: WO2008/070911
PCT Pub. Date: Jun. 19, 2008

(65) Prior Publication Data
US 2010/0150187 A1 Jun. 17, 2010

(30) Foreign Application Priority Data

Dec. 15, 2006 (AU) .................................. 2006907027

(51) Int. Cl.
*H01S 3/10* (2006.01)
(52) U.S. Cl. ............................................. 372/22
(58) Field of Classification Search ............ 372/92, 372/34
See application file for complete search history.

(56) References Cited

U.S. PATENT DOCUMENTS

| | | | | |
|---|---|---|---|---|
| 3,975,693 A | * | 8/1976 | Barry et al. | 372/22 |
| 4,127,827 A | * | 11/1978 | Barry | 372/22 |
| 4,413,342 A | * | 11/1983 | Cohen et al. | 372/22 |
| 4,841,528 A | * | 6/1989 | Sipes et al. | 372/22 |
| 5,164,947 A | | 11/1992 | Lukas et al. | |
| 5,898,717 A | | 4/1999 | Yin | |
| 5,936,983 A | * | 8/1999 | Yusong et al. | 372/22 |
| 6,141,369 A | | 10/2000 | Seelert et al. | |
| 6,287,298 B1 | | 9/2001 | Nighan et al. | |
| 7,529,281 B2 | * | 5/2009 | Leonardo et al. | 372/22 |
| 7,535,938 B2 | * | 5/2009 | Luo et al. | 372/21 |
| 7,627,008 B2 | * | 12/2009 | Park | 372/22 |
| 2007/0053387 A1 | * | 3/2007 | Dell'Acqua et al. | 372/21 |

FOREIGN PATENT DOCUMENTS

| | | |
|---|---|---|
| EP | 0 749 186 B1 | 4/2002 |
| WO | WO 87/06774 A1 | 11/1987 |
| WO | WO 96/18433 A1 | 6/1996 |
| WO | WO 01/67562 A2 | 9/2001 |
| WO | WO 03/026081 A2 | 3/2003 |
| WO | WO 2004/095660 A1 | 11/2004 |
| WO | WO 2007/118269 A1 | 10/2007 |

OTHER PUBLICATIONS

C. Czeranowsky, E. Heumann, G. Huber, "All-solid-state continuous-wave frequency-double Nd:YAG-BiBO laser with 2.8-W output at 437 nm," Article, Optics Letters, Mar. 15, 2003, pp. 432-434, Hamburg, Germany.
International Search Report of corresponding PCT/AU2007/001912 application, mailed Feb. 8, 2008.
International Preliminary Report on Patentability of corresponding PCT/AU2007/001912 application, dated Nov. 6, 2008.

* cited by examiner

*Primary Examiner* — Jessica Stultz
*Assistant Examiner* — Tuan Nguyen
(74) *Attorney, Agent, or Firm* — Alston & Bird LLP

(57) ABSTRACT

A laser apparatus in which the elimination of separate optical components to provide intra-cavity polarization and compensation for thermally induced birefringence, and their associated losses, results in an improvement in efficiency and reduction in complexity over prior art designs.

18 Claims, 2 Drawing Sheets

LASER

This invention relates to a laser apparatus and in particular to a laser apparatus capable of producing a visible laser beam with high efficiency. The invention is most applicable to a diode pumped laser apparatus.

BACKGROUND TO THE INVENTION

Diode laser pumped, frequency doubled, solid-state lasers have been used for many years to produce laser beams in the visible wavelength range and are useful in a variety of applications. The efficiency with which the pumping laser beam energy is converted into the desired visible output laser wavelength is of critical importance in terms of the cost and size of the device that can be constructed.

International patent application number PCT/IB2004/001197 (Bright Solutions et al, publication number WO2004/095660) describes a laser apparatus for generating a visible laser beam using a minimum of optical components. The efficiency of the Bright Solutions design is limited by the need to use an active gain material with a linearly polarized emission, which restricts the available materials and therefore the choice of wavelength and output power levels.

International patent application number PCT/US2001/007166 (Melles Griot Inc, publication number WO2001/067562) also describes a laser apparatus for generating a laser beam using a minimum of optical components, however the efficiency of this design is limited by the intra-cavity depolarization losses caused by thermally induced birefringence within the active gain material and in addition it does not select the optimal polarization of the fundamental wavelength to allow efficient type 1 frequency doubling.

As reported in Optics Letters on Mar. 15, 2003, researchers at the University of Hamburg achieved a record efficiency for blue continuous wave laser power generation from a diode pumped solid-state laser by producing an output of 2.8 W of 473 nm light when pumped with 21 W of 808 nm radiation from a diode laser. In their design the efficiency is improved by placing a quarter-wave plate between the laser rod and the back mirror so that light that is depolarized by the laser rod's thermal birefringence is reversed on a second passage through the rod. In addition a Brewster Plate is placed between the mirrors to select the optimal linear polarization for frequency doubling. While the efficiency is improved by these means the additional components introduce unnecessary losses.

OBJECT OF THE INVENTION

It is an object of the present invention to provide a laser apparatus which is capable of producing a visible laser beam with high efficiency.

Further objects will be evident from the following description.

DISCLOSURE OF THE INVENTION

In one form, although it need not be the only or indeed the broadest form, the invention resides in a laser apparatus comprising:
a folded cavity defined by a first end mirror, a second end mirror and an output coupler;
an optically isotropic active gain medium in the cavity between the first end mirror and the output coupler that generates fundamental optical radiation at a fundamental wavelength, wherein the optically isotropic active gain medium is cut, mounted and cooled in such a manner as to minimize thermally induced birefringence;
a non-linear crystal in the cavity between the second end mirror and the output coupler that converts the optical radiation at the fundamental wavelength to an output wavelength using type 1 phase matching and which is cut and oriented for the most efficient generation of the output wavelength; wherein
the first end mirror has high reflectance at the fundamental wavelength;
the second end mirror has high reflectance at the fundamental wavelength and high reflectance at the output wavelength; and
the output coupler has high reflectance at one polarization of the fundamental radiation, low reflectance at an orthogonal polarization of the fundamental radiation, and high transmission at the output wavelength.

Preferably the laser apparatus further comprises a laser diode pump that produces laser radiation at a pump wavelength. The first end mirror suitably has a high transmission at the pump wavelength.

The gain medium is most suitably Nd:YAG generating fundamental radiation at a fundamental wavelength of 1123 nm. The non-linear crystal is most suitably a frequency doubling crystal that produces an output wavelength of 561.5 nm by Type I phase matching.

The output coupler acts as an intra-cavity polarizer, thus eliminating the requirement for a separate polarizing optical component. The elimination of separate optical components to provide intra-cavity polarization and compensation for thermally induced birefringence, and their associated losses, results in an improvement in efficiency and reduction in complexity over prior art designs.

Throughout the specification, unless the context requires otherwise, the words "comprise", "comprises" and "comprising" will be understood to imply the inclusion of a stated integer or group of integers but not the exclusion of any other integer or group of integers.

BRIEF DETAILS OF THE DRAWINGS

To assist in understanding the invention preferred embodiments will now be described with reference to the following figures in which.

DETAILED DESCRIPTION OF THE DRAWINGS

Figure 1:
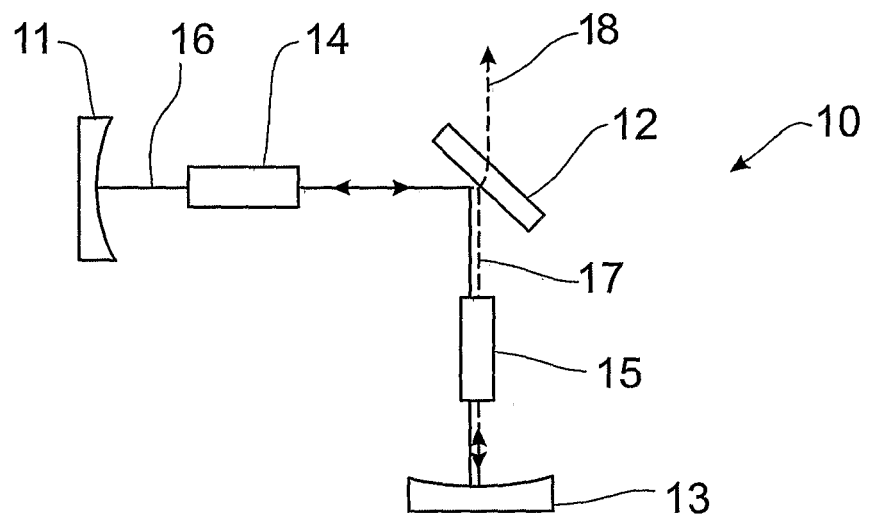
FIG. 1 is a block diagram of a first embodiment of a laser cavity.

In describing different embodiments of the present invention common reference numerals are used to describe like features.

Referring to FIG. 1 there is shown a folded laser cavity 10 defined by a first end mirror 11, an output coupler 12 and a second end mirror 13. An active gain medium 14 is located between first end mirror 11 and the output coupler 12. A typical active gain medium is Nd:YAG, which produces optical radiation at a fundamental wavelength of 1123 nm. Nd:YAG is an optically isotropic gain medium with small thermal aberration for the cavity mode. Other isotropic gain media with similar properties would also be suitable such as Er:YAG, Yb:YAG, Ho:YAG and Tm:YAG.

The active gain medium 14 generates a circulating coherent fundamental beam 16 in the cavity defined by the first end mirror 11 and the second end mirror 13. The active gain medium 14 is cut, mounted and optionally cooled to minimize thermally induced birefringence, thus eliminating the requirement for additional optical components to compensate for the birefringence. For example the active gain medium 14 can be cut in the direction of the <1 0 0> orientation. Cooling can be improved by the use of a diffusion bonded undoped cap on the end of the active gain medium 14 to act as heatsink.

A non-linear crystal 15 is located between the output coupler 12 and the second end mirror 13. The non-linear crystal 15 will typically be a frequency doubling crystal (second harmonic generator), such as LBO, that performs frequency conversion by Type 1 phase matching. Other suitable materials that allow Type 1 phase matching, such as BIBO may also be used.

The non-linear crystal 15 frequency doubles the fundamental beam 16 from the fundamental wavelength to form a converted beam 17 at a second harmonic wavelength. The output coupler 12 permits the converted beam 17 to exit the cavity as laser beam 18 but reflects the fundamental beam 16 thus forming a folded cavity. The non-linear crystal is cut and oriented for most efficient wavelength conversion of the fundamental wavelength for the polarization circulating in the cavity.

Figure 2:
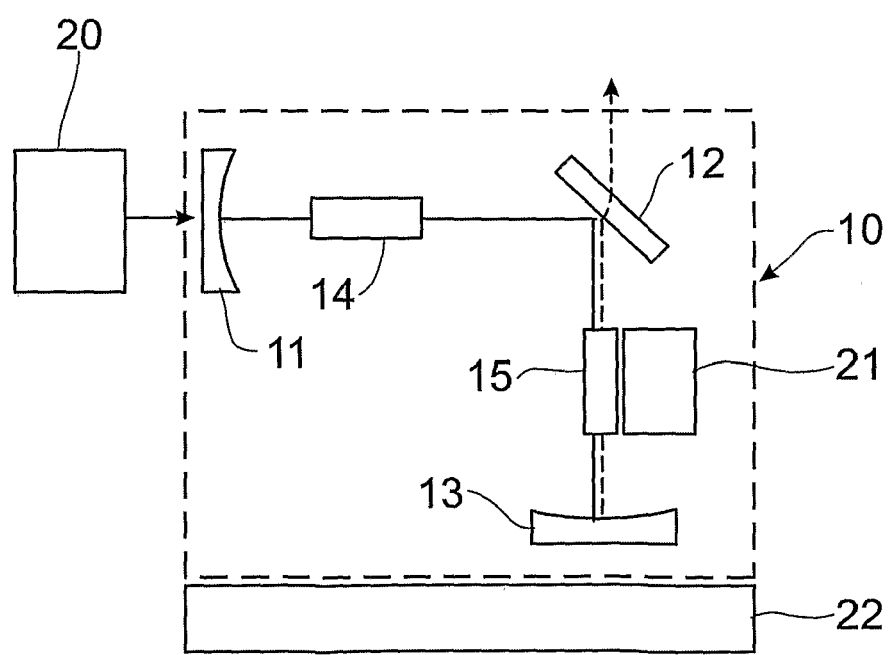
FIG. 2 is a block diagram of the laser cavity including temperature control devices and diode laser source.

As shown in FIG. 2, the laser apparatus 10 is most conveniently configured as a diode-pumped solid-state laser. A diode pump source 20 pumps the active gain medium 14 through the first end mirror 11. The first end mirror 11 has high transmission at the pump wavelength but high reflectance at the fundamental wavelength. A suitable pump source is a fiber coupled laser diode array emitting at 800-810 nm.

In order to provide thermal stability for Type 1 phase matching the frequency doubling crystal 15 may be thermally stabilized by temperature locking device 21. A suitable device is a Peltier effect cooler with a feedback loop driven by a thermocouple in the crystal mount.

To provide stable performance of the laser apparatus 10 it may be necessary to ensure thermal stability. As shown in FIG. 2, a cooling means 22 may be associated with the cavity to maintain a thermal equivalence of all the optical elements. One suitable approach is to mount the components on a water-cooled copper block. Other approaches are known in the art.

Figure 3:
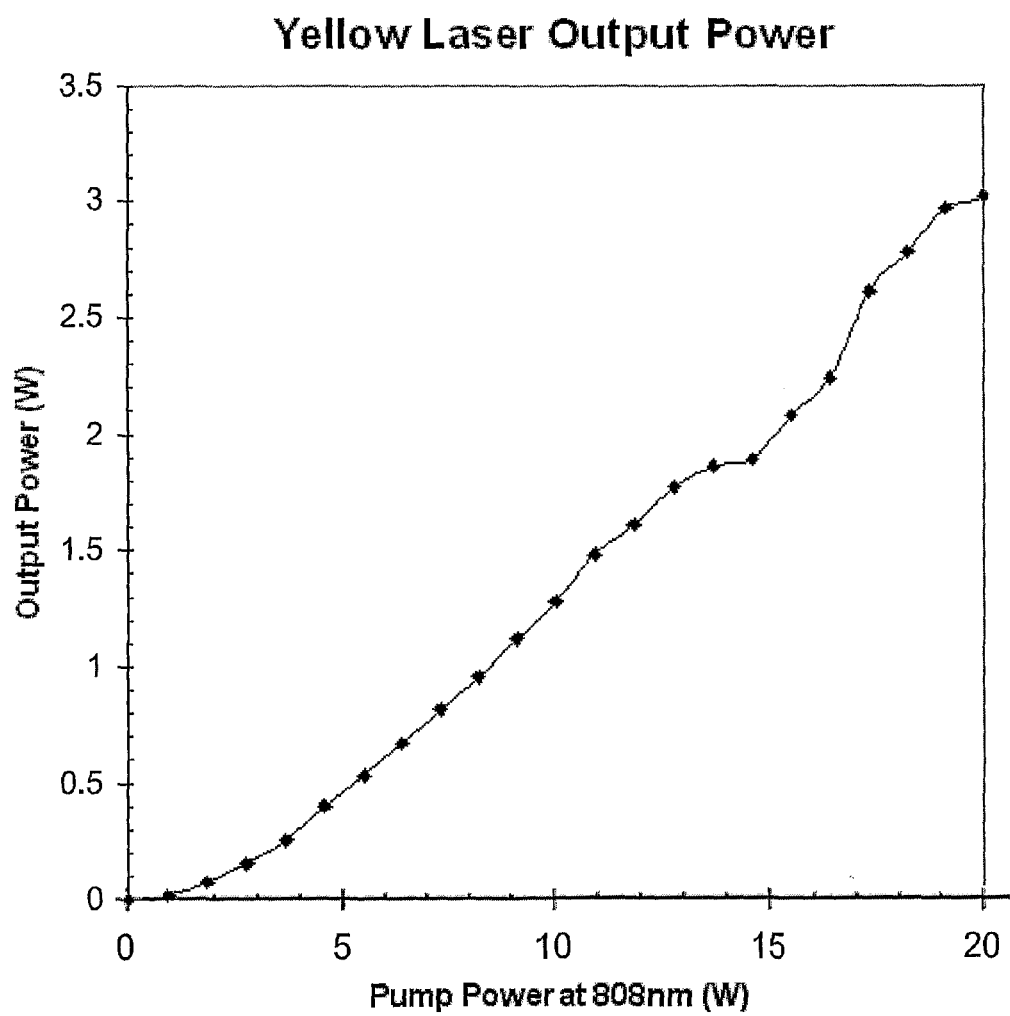
FIG. 3 is a graph of the measured performance characteristics of the preferred embodiment laser design showing the output power obtained relative to the input power.

To demonstrate the benefit of the invention a chart of laser efficiency is shown in FIG. 3. The chart displays the output power as a function of input power for a frequency doubled solid state laser configured as shown in FIG. 2. The pump source is a fiber coupled laser diode array delivering up to 20 W of power. The active gain medium is Nd:YAG and the non-linear crystal is LBO. The first end mirror has high transmittance at 808 nm and high reflectance at 1123 nm. The second end mirror has high reflectance at 1123 nm and high reflectance at 561.5 nm. The output coupler has high transmittance at 561.5 nm so the frequency doubled radiation exits the cavity as a laser beam. The output coupler has high reflectance for one linear polarization of optical radiation at 1123 nm and has a reflectance in the orthogonal plane which is low enough to ensure that the orthogonal polarization is suppressed. The dependence of reflectance on polarization acts as a non-linear loss mechanism that causes the active gain medium to lase with linear polarization.

It can be seen from FIG. 3 that the efficiency of the laser apparatus approaches 15%.

The laser apparatus has a minimal number of optical components and therefore has minimal intracavity losses. The laser is also more stable than those known in the prior art because there are less elements to thermally stabilize. The simple design allows a very compact device to be constructed and a beam path length of 40 mm between mirrors 11 and 13 is readily achievable.

Throughout the specification the aim has been to describe the preferred embodiments of the invention without limiting the invention to any one embodiment or specific collection of features. Various modifications and variations will be evident to persons skilled in the art which fall within the broad scope of the invention.

The invention claimed is:

1. A laser apparatus comprising:
    a folded cavity defined by a first end mirror, a second end mirror and an output coupler;
    an optically isotropic active gain medium in the cavity between the first end mirror and the output coupler that generates fundamental optical radiation at a fundamental wavelength; and
    a non-linear crystal in the cavity between the second end mirror and the output coupler that converts the optical radiation at the fundamental wavelength to an output wavelength using type 1 phase matching; wherein
        the first end mirror has high reflectance at the fundamental wavelength,
        the second end mirror has high reflectance at the fundamental wavelength and high reflectance at the output wavelength, and
        the output coupler has high reflectance at one polarization of the fundamental radiation, low reflectance at an orthogonal polarization of the fundamental radiation, and high transmission at the output wavelength, and wherein the output coupler acts as an intra-cavity polarizer thereby eliminating the requirement for a separate polarizing optical component.

2. The laser apparatus of claim 1 further comprising a laser diode pump that produces laser radiation at a pump wavelength.

3. The laser apparatus of claim 2 wherein the first end mirror has a high transmission at the pump wavelength.

4. The laser apparatus of claim 2 wherein the laser diode pump is a fiber coupled laser diode array that produces laser radiation at a pump wavelength range of 800 nm to 810 nm.

5. The laser apparatus of claim 1 wherein the gain medium is Nd:YAG that generates fundamental radiation at a fundamental wavelength of 1123 nm.

6. The apparatus of claim 1 wherein the gain medium selected from Er:YAG, Yb:YAG, Ho:YAG, and Tm:YAG.

7. The laser apparatus of claim 1 wherein the non-linear crystal is a frequency doubling crystal that produces an output wavelength of 561.5 nm by Type 1 phase matching.

8. The laser apparatus of claim 7 wherein the frequency doubling crystal is thermally stabilised by a temperature locking device.

9. The laser apparatus of claim 8 wherein the temperature locking device is a Peltier effect cooler with a feedback loop driven by a thermocouple located adjacent the frequency doubling crystal.

10. The laser apparatus of claim 1 wherein the optically isotropic active gain medium is cut, mounted and cooled to minimize thermally induced birefringence.

11. The laser apparatus of claim 10 wherein the optically isotropic active gain medium is cut in the direction of the <1 0 0> orientation.

12. The laser apparatus of claim 10 wherein the optically isotropic active gain medium is cooled by a heatsink.

13. The laser apparatus of claim 12 wherein the heatsink comprises a diffusion bonded undoped cap located on the end of the optically isotropic active gain medium.

14. The laser apparatus of claim 1 wherein the non-linear crystal is cut and oriented for the most efficient generation of the output wavelength.

15. The laser apparatus of claim 1 wherein the non-linear crystal is a frequency doubling LBO crystal.

16. The laser apparatus of claim 1 wherein the non-linear crystal is a frequency doubling BIBO crystal.

17. The laser apparatus of claim 1 further comprising a cooling means to maintain all the optical elements of the cavity at the same temperature.

18. The laser apparatus of claim 1 further comprising a water-cooled copper block on which the cavity is mounted.

* * * * *